US008664884B2

(12) United States Patent
Li et al.

(10) Patent No.: US 8,664,884 B2
(45) Date of Patent: Mar. 4, 2014

(54) LED DRIVING CIRCUIT AND FEEDBACK CONTROL CIRCUIT THEREOF

(75) Inventors: Hai-Po Li, Wuxi (CN); Shian-Sung Shiu, New Taipei (TW); Li-Min Lee, New Taipei (TW)

(73) Assignee: Green Solution Technology Co., Ltd., New Taipei (TW)

( * ) Notice: Subject to any disclaimer, the term of this patent is extended or adjusted under 35 U.S.C. 154(b) by 342 days.

(21) Appl. No.: 13/241,299

(22) Filed: Sep. 23, 2011

(65) Prior Publication Data

US 2012/0176048 A1     Jul. 12, 2012

(30) Foreign Application Priority Data

Jan. 12, 2011   (CN) .......................... 2011 1 0021868

(51) Int. Cl.
    *G05F 1/00*     (2006.01)
(52) U.S. Cl.
    USPC ........ 315/291; 315/307; 315/247; 315/185 S; 315/312

(58) Field of Classification Search
    USPC .............. 315/247, 224, 291, 307–326, 185 S, 315/276–279
    See application file for complete search history.

(56) References Cited

U.S. PATENT DOCUMENTS

2008/0100234 A1*   5/2008   Chen et al. .................... 315/312

* cited by examiner

*Primary Examiner* — Tuyet Thi Vo
(74) *Attorney, Agent, or Firm* — CKC & Partners Co., Ltd.

(57) ABSTRACT

An LED (Light-Emitting Diode) driving circuit to drive an LED module is provided. The LED driving circuit includes a converting circuit and a feedback control circuit. The converting circuit is coupled to the LED module, and converts an input voltage into an output voltage according to at least one control signal. The feedback control circuit generates the control signal to control the converting circuit to perform voltage conversion according to a feedback signal. In addition, the feedback control circuit receives a dimming signal, and is operated in a first state or a second state in response to the dimming signal, wherein the feedback control circuit adjusts the duty cycle of the control signal to have the duty cycle larger than or equal to a predetermined duty cycle in a predetermined period right after the feedback control circuit is operated from the second state to the first state.

17 Claims, 5 Drawing Sheets

LED DRIVING CIRCUIT AND FEEDBACK CONTROL CIRCUIT THEREOF

RELATED APPLICATIONS

This application claims priority to China Application Serial Number 201110021868.6, filed Jan. 12, 2011, which is herein incorporated by reference.

BACKGROUND OF THE INVENTION (1) Field of the Invention

This invention relates to an LED (Light-Emitting Diode) driving circuit and a feedback control circuit thereof, and more particularly relates to an LED driving circuit with precise dimming control and a feedback control circuit thereof.

(2) Description of the Prior Art

Because of the properties of long lifetime, high luminance efficiency, and fast and steady illumination, etc., an LED has been broadly accepted as a main trend of light sources for the next generation in recent years. The LEDs can be used in various applications, including indoor lighting, outdoor lighting, and commercial advertisement lighting, etc., and thus the existing light sources are gradually replaced by the LEDs. It is an important issue regarding how to make the LEDs generate illumination with steady brightness and uniform color and to provide proper protection to the LEDs so as to exhibit the lighting advantages of the LEDs.

Figure 1:
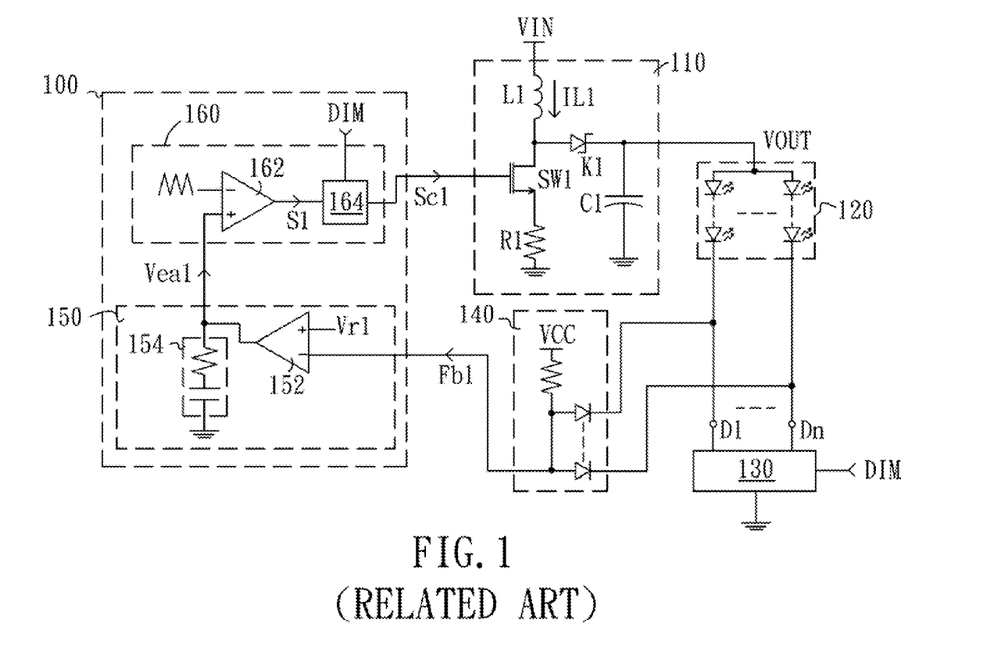
FIG. 1 is a circuit diagram of a typical LED driving circuit.

FIG. 1 is a circuit diagram of a typical LED driving circuit. As shown in FIG. 1, the LED driving circuit includes a feedback control circuit 100, a converting circuit 110, and an LED module 120. The converting circuit 110 is coupled to an input power source VIN for converting the input power source VIN into an output voltage VOUT to drive the LED module 120 for illumination. The conversion operation performed by the converting circuit 110 may be a step-up conversion or a step-down conversion. Take a DC-to-DC boost converting circuit as an example. The converting circuit 110 includes an inductor L1, a transistor SW1, a rectifying diode K1, and an output capacitor C1. The inductor L1 has one end coupled to the input power source VIN and the other end coupled to the transistor SW1, and an inductor current IL1 flows through the inductor L1. The transistor SW1 has one end coupled to the inductor L1 and another end coupled to the ground through a resistor R1. The output capacitor C1 has one end coupled to a junction between the inductor L1 and the transistor SW1 through the rectifying diode K1 and the other end grounded. The LED module 120 has a plurality of LED strings connected in parallel. To make sure a substantially identical current flowing through each of the LED units in the LED module 120, a current balancing unit 130 with a plurality of current balancing ends D1~Dn coupled to the corresponding LED strings in the LED module 120 is used for balancing the current of each of the LED strings, so as to have the current stabilized at a predetermined current value. The driving voltages of the current balancing ends D1~Dn should be maintained at or above a lowest operable voltage level to make sure that the current balancing unit 130 works normally. For detecting the driving voltage, a voltage detecting circuit 140 is used and is coupled to the current balancing ends D1~Dn for detecting the level of the current balancing ends D1~Dn, which would be varied in response to the variations of voltage difference on the LED strings through while a current with the predetermined current value flows. To have the current balancing ends D1~Dn at or above a lowest operable voltage level, the voltage detecting circuit 140 generates a feedback signal Fb1 according to the level of the current balancing end which has the lowest level among all the current balancing ends D1~Dn. The feedback control circuit 100 controls the converting circuit 110 to generate the output voltage VOUT according to the feedback signal Fb1 to maintain all the current at or above the predetermined current value. The current balancing unit 130 also receives a dimming signal DIM and starts or stops the current flowing through the LED module 120 according to the dimming signal DIM for the burst dimming control. The voltage detecting circuit 140 may have a plurality of diodes, and each diode has a negative end coupled to the corresponding current balancing end D1~Dn and a positive end coupled to a common driving power source VCC through the same resistor.

The feedback control circuit 100 includes a feedback unit 150 and a pulse width control unit 160. The feedback unit 150 includes an amplifying unit 152 and a compensation unit 154. The amplifying unit 152 receives the feedback signal Fb1 and a reference signal Vr1 so as to generate an output signal. The output signal is then compensated by the compensation unit 154, so as to generate a pulse width control signal Vea1. The pulse width control unit 160 includes a pulse width modulation unit 162 and a driving unit 164. The pulse width modulation unit 162 receives the pulse width control signal Vea1 and a ramp signal so as to generate a pulse width modulation signal S1. The driving unit 164 receives the pulse width modulation signal S1 and the dimming signal DIM, and accordingly generates a control signal Sc1.

Figure 2:
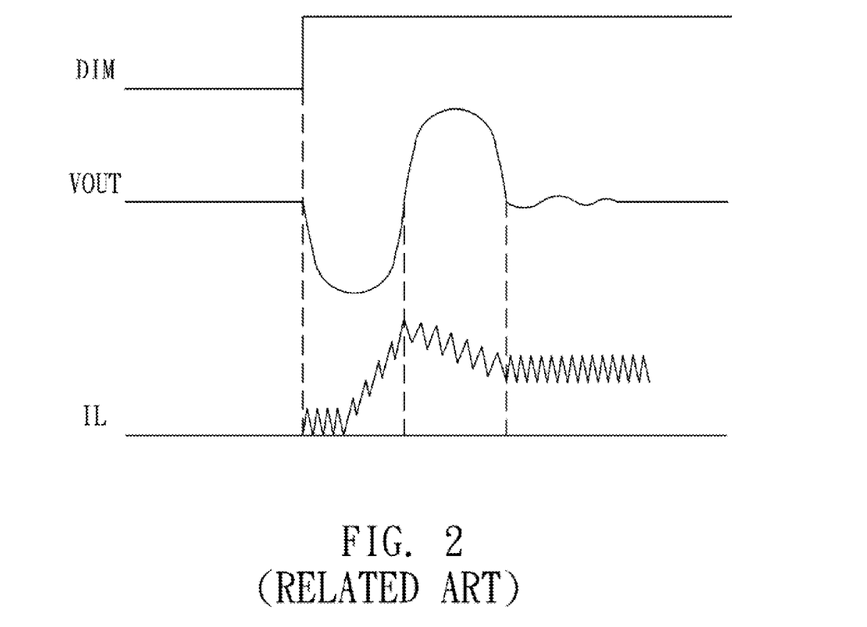
FIG. 2 is a diagram of waveforms showing the signals related to dimming control of the LED driving circuit in FIG. 1.

Due to the capacitor of the compensation unit 154, the level of the pulse width control signal Vea1 is varied slowly. Referring to FIG. 2, the peak value of the inductor current IL1 on the inductor L1 cannot be rapidly increased in response to the dimming signal DIM, which may result in the insufficiency of power transferred from the converting circuit 110 to the LED module 120. Right after the dimming signal DIM is changed to "ON" state, the output voltage VOUT may drop to an extremely low level first and then rise to converge on a stable level. The low level output voltage VOUT may result in a driving current which is smaller than the predetermined current value within a period right after the state of the dimming signal DIM is changed from the "OFF" state to the "ON" state, such that precision of dimming control for the LED module is badly influenced.

SUMMARY OF THE INVENTION

In view of the problem of imprecise dimming control for the LED driving circuit addressed in prior art, the present invention adapts the period right after the dimming signal is changed from "OFF" state to "ON" state to enhance the output power of the converting circuit so as to have the current on the LED module be rapidly stabilized at the predetermined current value.

In order to achieve the aforementioned object, a feedback control circuit is provided in the present invention for controlling a converting circuit to transform a power from a power source to drive an LED module. The feedback control circuit includes a feedback unit, a pulse width control unit. The feedback unit receives a feedback signal in response to a state of the LED module for generating a pulse width control signal. The feedback unit has a dimming adjusting unit for generating a dimming adjusting signal according to a time sequence of a dimming signal. The pulse width control unit generates at least one control signal with a duty cycle in response to the pulse width control signal for controlling the converting circuit to perform power conversion operation. The dimming signal is changed between a first state and a second state, and the pulse width control signal increases the duty cycle of the at least one control signal with a predetermined value within a period right after the dimming signal is changed from the second state to the first state.

Another feedback control circuit is also provided in accordance with the present invention for controlling a converting circuit to transform a power from a power source to drive an LED module. The feedback control circuit includes a feedback unit and a pulse width control unit. The feedback unit receives a feedback signal in response to a state of the LED module so as to generate a pulse width control signal. The pulse width control unit generates at least one control signal according to the pulse width control signal for controlling the converting circuit to perform power conversion operation. The feedback control circuit is operated between a first state and a second state in response to the dimming signal. The pulse width control unit increases a duty cycle of the at least one control signal with a predetermined value within a period right after the feedback control circuit is operated from the second state to the first state.

An LED driving circuit, adapted for driving an LED module, is also provided in the present invention. The LED driving circuit includes a converting circuit and a feedback control circuit. The converting circuit is coupled to the LED module and receives at least one control signal to convert an input voltage into an output voltage to drive the LED module. The feedback control circuit generates the at least one control signal to control the converting circuit performing power conversion operation according to a feedback signal. The feedback control circuit is operated between a first state and a second state according a received dimming signal. The feedback control circuit modulates a duty cycle of the at least one control signal within a period right after the feedback control circuit is operated from the second state to the first state to have the duty cycle of the at least one control signal not smaller than a predetermined duty cycle.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 3:
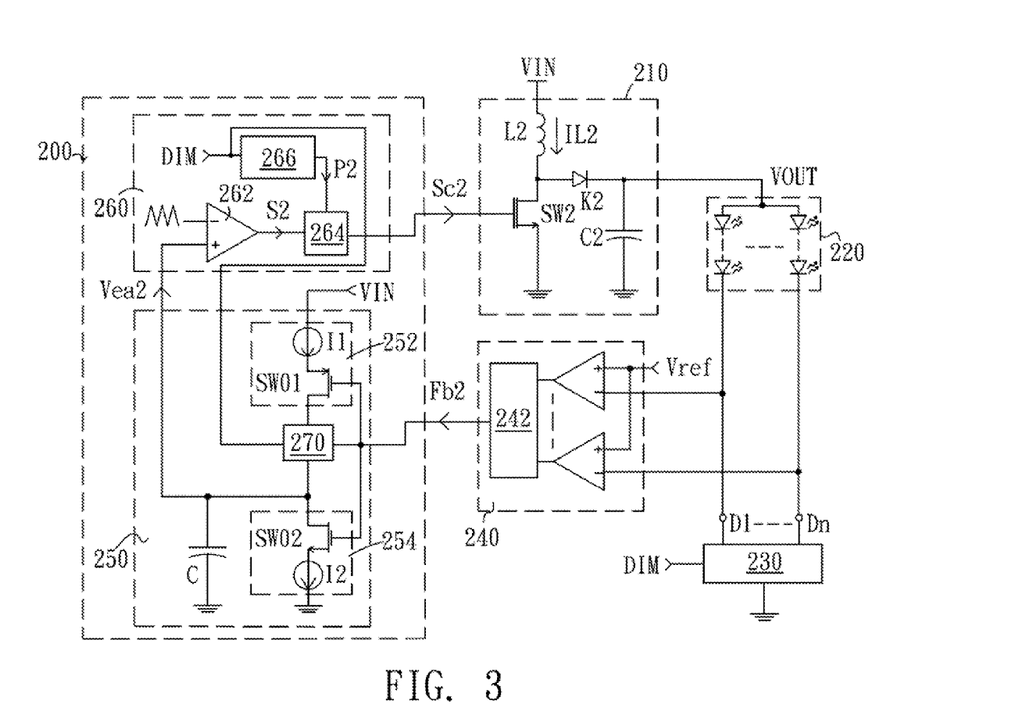
FIG. 3 is a circuit diagram of an LED driving circuit in accordance with a first preferred embodiment of the present invention.

FIG. 3 is a circuit diagram of an LED driving circuit in accordance with a first preferred embodiment of the present invention. As shown in FIG. 3, the LED driving circuit includes a feedback control circuit 200 and a converting circuit 210, and is utilized for driving an LED module 220 with a plurality of LED strings connected in parallel. The converting circuit 210 is coupled to an input power source VIN for converting (such as boost converting or buck converting) the input power source VIN into an output voltage VOUT to drive the LED module 220 for illumination.

In the present embodiment, the converting circuit 210 is a DC-to-DC boost converting circuit, which includes an inductor L2, a transistor SW2, a rectifying diode K2, and an output capacitor C2. The inductor L2 has one end coupled to the input power source VIN and the other end coupled to one end of the transistor SW2, wherein an inductor current IL2 flows through the inductor L2. The transistor SW2 has one end coupled to the inductor L2 and another end grounded. The output capacitor C2 has one end coupled to a junction between the inductor L2 and the transistor SW2 through the rectifying diode K2 and the other end grounded.

To make sure that an identical steady current is generated and flows through each of the LED units in the LED module 220, a current balancing unit 230 with a plurality of current balancing ends D1~Dn is used. The current balancing ends D1~Dn are coupled to the corresponding LED strings in the LED module 220 for balancing the current flowing through the LED strings, so as to have the current be stabilized at a predetermined current value. The driving voltages for generating a current flow with the predetermined current value on the LED strings are usually different, because of the variety of LED units that have different threshold voltages. Thus, the current balancing ends D1~Dn may show different voltage levels. The levels of the current balancing ends D1~Dn should be maintained at or above a lowest operable level for guaranteeing the current balancing unit 230 working normally to maintain the currents flowing through each of the LED strings at the predetermined current value.

For the aforementioned purpose, a voltage detecting circuit 240 is added in the present embodiment. The voltage detecting circuit 240 is coupled to the current balancing ends D1~Dn and generates a feedback signal Fb2 according to the lowest level one among the levels of all the current balancing ends D1~Dn. The current balancing unit 230 also receives a dimming signal DIM and starts or stops the current flowing through the LED module 220 according to the state of the dimming signal DIM. In this circuit, the dimming signal DIM is changed between a first state and a second state. As the dimming signal DIM is in the first state, the currents with the predetermined current value flow through all LED strings of the LED module 220. As the dimming signal DIM is in the second state, the currents stop. The voltage detecting circuit 240 may have a plurality of comparators and a logic unit 242. The inverting inputs of the comparators are coupled to the corresponding current balancing ends D1~Dn and the non-inverting inputs thereof are connected with each other for receiving a reference voltage Vref. The logic unit 242 generates the feedback signal Fb2 to the feedback control circuit 200 according to the output signals of comparators.

The feedback control circuit 200 includes a feedback unit 250 and a pulse width control unit 260, and is utilized for generating a control signal Sc2 according to the feedback signal Fb2 to control the converting circuit 210 to convert the input power source VIN into an appropriate output voltage VOUT to drive the LED module 220. The feedback unit 250 receives the feedback signal Fb2 representing the condition of the LED module 220 and generates a pulse width control signal Vea2 accordingly. The feedback unit 250 includes a charging unit 252, a discharging unit 254, a compensating capacitor C, and a dimming adjusting unit 270. The charging unit 252 has a first current source I1 serially connected to a first switch SW01, and the discharging unit 254 has a second current source I2 serially connected to a second switch SW02, and the charging unit 252 and the discharging unit 254 are coupled to the compensating capacitor C.

As the level of any one of the current balancing ends D1~Dn is lower than the reference voltage Vref, the feedback signal Fb2 is at a low level to enable the first current source I1 to charge the compensating capacitor C through the conducted first switch SW01. On the other hand, as the levels of all the current balancing ends D1~Dn are higher than the reference voltage Vref, the feedback signal Fb2 is at a high level to enable the second current source I2 to discharge the compensating capacitor C through the conducted second switch SW02.

The pulse width control unit 260 includes a pulse width modulation unit 262, a dimming control unit 266, and a driving unit 264, and is utilized for adjusting a duty cycle of the control signal Sc2 according to the pulse width control signal Vea2 generated by the compensating capacitor C. The pulse width modulation unit 262 may be a comparator with an inverting input for receiving the pulse width control signal Vea2 and a non-inverting input for receiving a ramp signal, so as to generate and output a pulse width modulation signal S2 to the driving unit 264. The dimming control unit 266 receives the dimming signal DIM and generates a dimming control signal P2 with periodic pulses when the dimming signal DIM is in the second state representing "OFF", and generates a high level dimming control signal P2 when the dimming signal DIM is in the first state representing "ON". The driving unit 264 receives the pulse width modulation signal S2 and the dimming control signal P2. When the dimming signal DIM is in the first state, the driving unit 264 generates the control signal Sc2 according to the pulse width modulation signal S2 to make the LED module 220 generate steady illumination. When the dimming signal DIM is in the second state, the driving unit 264 generates the control signal Sc2 with a smallest duty cycle according to the dimming control signal P2. Meanwhile, the current balancing unit 230 also stops the current flowing through the LED module 220 according to the dimming signal DIM, so as to make the LED module 220 stop generating illumination. Thereby, the feedback control circuit 200 is capable of controlling the converting circuit 210 executing a minimum amount of power transmission to compensate power loss due to the leakage current or other circuit problems. Thus, the level of the output voltage VOUT generated by the converting circuit 210 can be maintained within a range close to the level when the dimming signal DIM is in the first state.

The dimming adjusting unit 270 is connected between the first switch SW01 and the compensating capacitor C for adjusting a level of the pulse width control signal Vea2 according to the dimming signal DIM. Within a period right after the dimming signal DIM is changed from the second state to the first state, the dimming adjusting unit 270 enhances the level of the pulse width control signal Vea2 with a predetermined level, so as to increase the duty cycle of the control signal Sc2 by a responded predetermined value for quickly enhancing the output power of the converting circuit 210. Accordingly, the current flowing through the LED module 220 will be rapidly rebounded to the predetermined current value right after the dimming signal DIM is changed from the second state to the first state, thereby improving the problem of imprecise dimming control.

Figure 4:
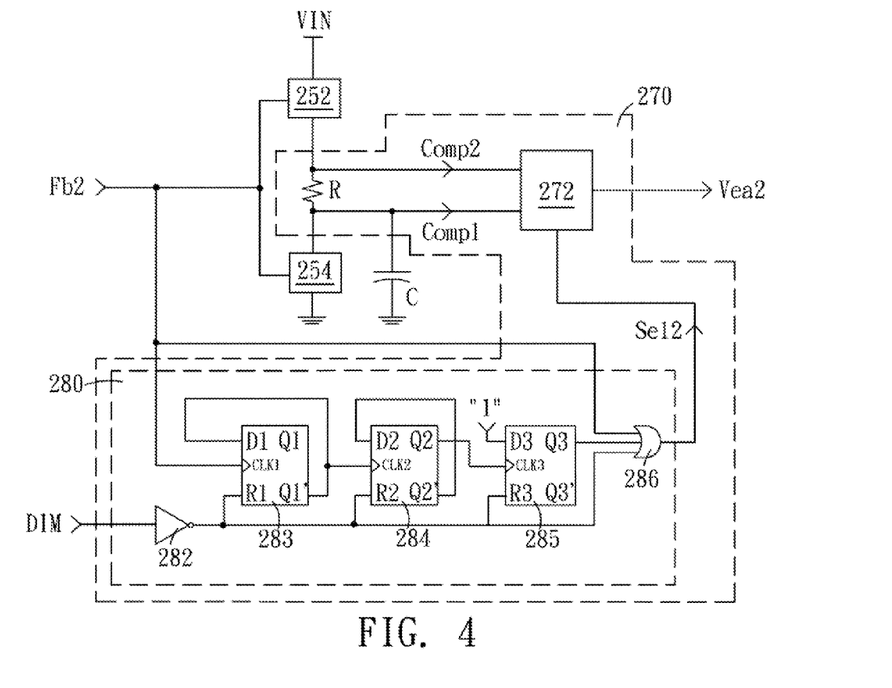
FIG. 4 is a circuit diagram of a dimming adjusting unit of FIG. 3 in accordance with a preferred embodiment of the present invention.

FIG. 4 is a circuit diagram of a dimming adjusting circuit of FIG. 3 in accordance with a preferred embodiment of the present invention. Also referring to FIG. 3, the dimming adjusting unit 270 includes a level difference generating unit R, a selection unit 272, and a level adjusting unit 280. The level difference generating unit R is coupled between the charging unit 252 and the discharging unit 254 for generating a first level signal COMP1 at a low side end and a second level signal COMP2 at a high side end, and the low side end of the level difference generating unit R is also coupled to the compensating capacitor C. The level adjusting unit 280 includes an inverter 282, a first D flip-flop 283, a second D flip-flop 284, a third D flip-flop 285, and an OR gate 286. The level adjusting unit 280 generates a selecting signal Sel2 according to the dimming signal DIM. The selection unit 272 receives the selecting signal Sel2, and accordingly selects one of the first level signal COMP1 and the second level signal COMP2 as the pulse width control signal Vea2.

The first D flip-flop 283 has a clock input CLK1 for receiving the feedback signal Fb2 and a data input D1 coupled to an output Q1' thereof. The output Q1' is also coupled to a clock input CLK2 of the second D flip-flop 284 to control the operation of the second D flip-flop 284. The second D flip-flop 284 has an input D2 coupled to an output Q2' thereof, and an output Q2 of the second D flip-flop 284 is coupled to a clock input CLK3 of the third D flip-flop 285. An input D3 of the third D flip-flop 285 receives a high level signal, which can be regarded as the binary digital signal "1".

The dimming signal DIM is fed into the inverter 282, and an inverted signal is generated to the reset inputs R1, R2, R3 of the three D flip-flops 283, 284, 285. Accordingly, as the dimming signal DIM is in the second state of low level, the output signals of the three D flip-flops 283, 284, 285 are reset to the low level.

Figure 5:
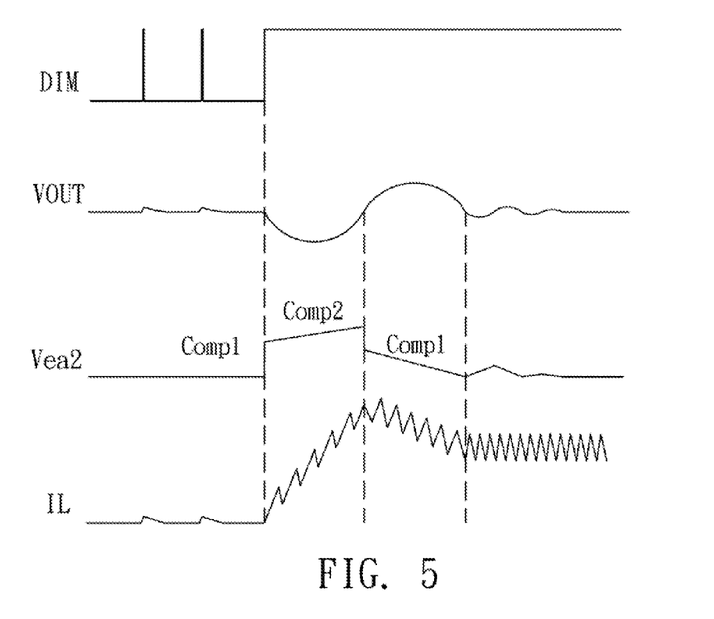
FIG. 5 is a diagram of waveforms showing the signals related to dimming control of the LED driving circuit of FIG. 3.

The OR gate 286 receives the feedback signal Fb2, the output signal of the third D flip-flop 285 and the inverted signal of the dimming signal DIM so as to output the selection signal Sel2. As shown in FIG. 5, when the dimming signal DIM is in the second state, the first D flip-flop 283, the second D flip-flop 284 and the third D flip-flop 285 are reset, and the selection signal Sel2 is at the high level. At this time, the selection unit 272 selects the first level signal COMP1 as the pulse width control signal Vea2. In the period right after the dimming signal DIM is changed from the second state to the first state, the output voltage VOUT drops to the level below a normal operation voltage at first because of the insufficiency of inductor current IL2, and thus a low level feedback signal Fb2 is generated. Meanwhile, the first current source I1 of the charging unit 252 charges the compensation capacitor C, and the output signal of the third flip-flop 285 will stay at the low level to generate the low level selection signal Sel2, so as to enable the selection unit 272 to select the second level signal COMP2 as the pulse width control signal Vea2. Since the relationship between the first level signal COMP1 and the second level signal COMP2 is: COMP2=COMP1+I1×R, the pulse width control signal Vea2 is enhanced with a level which is equal to the current of the first current source I1 times the resistance of the level difference generating unit R right after the dimming signal DIM is changed from the second state to the first state. Accordingly, the duty cycle of the control signal Sc2 is immediately increased to rapidly increase the inductor current IL2, so as to rapidly enhance the level of the output voltage VOUT to the normal operation voltage.

Then, the feedback signal Fb2 is changed to the high level to trigger the third D flip-flop 285 to output the high level signal, so as to enable the selection unit 272 to select the first level signal COMP1 as the pulse width control signal Vea2 again. The selection remains until the dimming signal DIM is changed from the second state to the first state. In the present embodiment, because of noise, the voltage detection circuit 240 may generate a short period high level signal as the feedback signal Fb2 right after the dimming signal DIM is changed from the second state to the first state. In order to prevent the error resulted from the short period high level signal, the level adjusting unit 280 changes the selection signal Sel2 to the high level after detecting two rising edges of the feedback signal Fb2. Therefore, the dimming adjusting unit 270 increases the duty cycle of the control signal Sc2 according to the feedback signal Fb2. In contrast with the driving circuit of FIG. 1 and the corresponding waveforms as shown in FIG. 2, the inductor current IL2 of the present embodiment can be rapidly increased to reduce the decreased amount of the output voltage VOUT after the dimming signal DIM is changed from the second state, so as to prevent the problem of imprecise dimming control.

Figure 6:
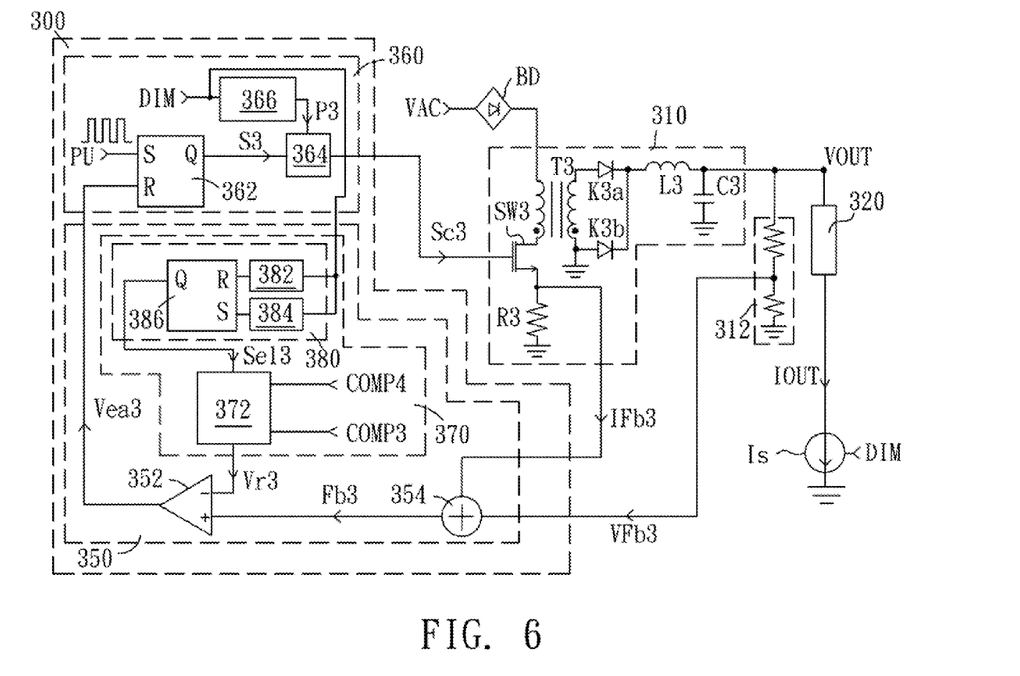
FIG. 6 is a circuit diagram of an LED driving circuit in accordance with a second preferred embodiment of the present invention.

FIG. 6 is a circuit diagram of an LED driving circuit in accordance with a second preferred embodiment of the present invention. The LED driving circuit includes a feedback control circuit 300 and a converting circuit 310, and is utilized for driving an LED module 320. The converting circuit 310 is coupled to an AC power source VAC through a bridge rectifier BD, and converts the power from the AC power source VAC to drive the LED module 320 according to a control signal Sc3. In the present embodiment, the converting circuit 310 is a forward converting circuit, which includes a transformer T3, a transistor SW3, rectifying diodes K3a, K3b, an inductor L3, and an output capacitor C3. One end of the primary side of the transformer T3 is coupled to the AC power source VAC, and the other end thereof is coupled to the transistor SW3. The transistor SW3 is also grounded through a resistor R3 so as to generate a current feedback signal IFb3. The output capacitor C3 is coupled to the secondary side of the transformer T3 through the rectifying diodes K3a, K3b and the inductor L3. A voltage detecting circuit 312 is coupled to the output capacitor C3 for generating a voltage feedback signal VFb3 representing the level of the output voltage VOUT. The LED module 320 is coupled to a current source to make the output current IOUT stabilized at a predetermined current value for generating steady illumination. The current source also receives a dimming signal DIM, and controls the on/off state of the current flowing through the LED module 320 according to the state of the dimming signal DIM. The dimming signal DIM is changed between a first state and a second state. When the dimming signal DIM is in the first state, a current with the predetermined current value is generated and flows through the LED module 320. When the dimming signal DIM is in the second state, the current is stopped from flowing through the LED module 320.

The control circuit 300 includes a feedback unit 350 and a pulse width control unit 360, and is utilized to control the converting circuit 300 to convert the power of the AC power source VAC to drive the LED module 320. The feedback unit 350 includes a comparator 352, a signal added unit 354, and a dimming adjusting unit 370. The signal added unit 354 receives the current feedback signal IFb3 and the voltage feedback signal VFb3 so as to generate a feedback signal Fb3. The dimming adjusting unit 370 includes a selection unit 372 and a level adjusting unit 380. In the present embodiment, the level adjusting unit 380 includes a delay unit 382, a trigger unit 384, and a SR flip-flop 386. The trigger unit 384 is a rising edge-triggered one-shot circuit, which receives the dimming signal DIM and outputs a high level signal to the set input S of the SR flip-flop 386 right after the dimming signal DIM is changed from the second state to the first state. The delay unit 382 receives the dimming signal DIM and waits for a predetermined delay time since receiving the dimming signal DIM, and then, the delay unit 382 outputs a control signal to the reset input R of the SR flip-flop 386 to reset the SR flip-flop 386. The output Q of the SR flip-flop 386 outputs a selection signal Sel3 to the selection unit 372. When the selection signal Sel3 is at the low level, the selection unit 372 selects the first level signal COMP3 as the dimming adjusting signal Vr3, and when the selection signal Sel3 is at the high level, the selection unit 372 selects the second level signal COMP4, which has a level higher than that of the first level signal COMP3, as the dimming adjusting signal Vr3. The dimming adjusting signal Vr3 is then fed into the inverting input of the comparator 352, and the feedback signal Fb3 is fed into the non-inverting input of the comparator 352, such that the comparator 352 outputs a pulse signal as the pulse width control signal Vea3.

The pulse width control unit 360 includes a pulse width modulation unit 362 and a driving unit 364. The pulse width modulation unit 362 is a SR flip-flop, which has a set input S for receiving a clock signal PU and a reset input R for receiving the pulse width control signal Vea3. As the SR flip-flop 362 receives the clock signal PU at the set input S thereof, a pulse width modulation signal S3 is generated at the output Q, and is fed to the driving unit 364. In addition, a dimming control unit 366 generates a pulse dimming control signal P3 according to the dimming signal DIM. The operation of the dimming control unit 366 is substantially identical to the dimming control unit 266 in FIG. 3, and thus is not described herein again. The driving unit 364 receives both the pulse width modulation signal S3 and the dimming control signal P3. When the dimming signal DIM is in the first state, the driving unit 364 generates the control signal Sc3 according to the pulse width modulation signal S3. When the dimming signal DIM is in the second state, the driving unit 364 generates the control signal Sc3 according to the dimming control signal P3. It is noted that in a predetermined period right after the dimming signal DIM is changed from the second state to the first state, the dimming adjusting unit 370 changes the output signal to the inverting input of the comparator 352 from the first level signal COMP3 to the second level signal COMP4 for adjusting a level of the pulse width control signal Vea3, so as to increase the duty cycle of the control signal Sc3 instantly. Thus, the inductor current flowing through the inductor L3 is rapidly increased to reduce the amount of level reduction of the output voltage VOUT, so as to improve the problem of imprecise dimming control for the LED module 320 as the dimming signal DIM is changed from the second state to the first state.

Figure 7:
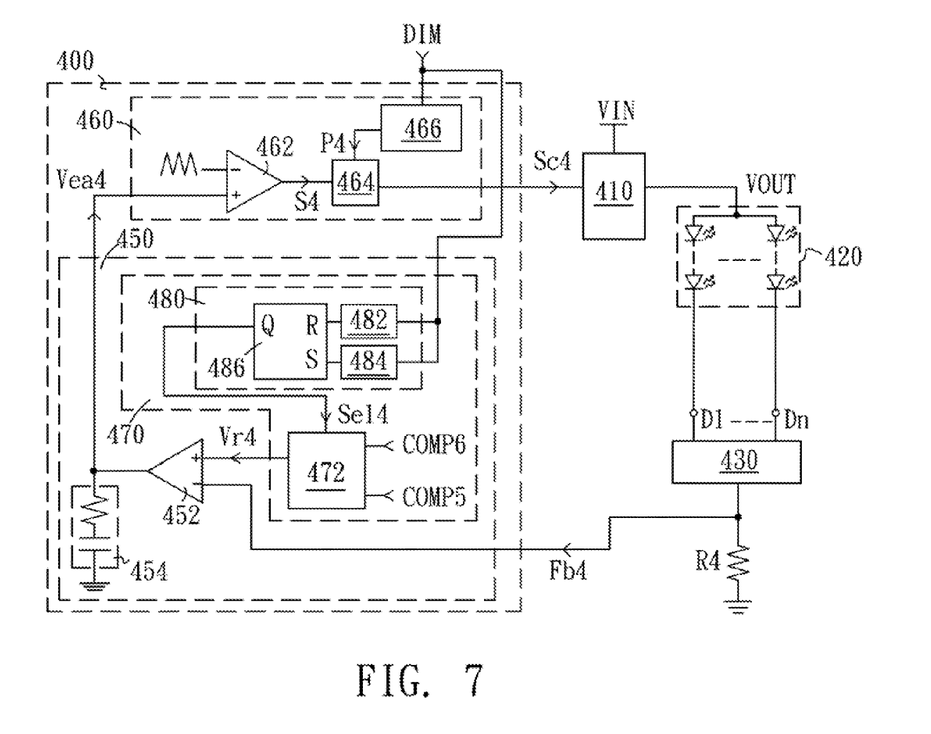
FIG. 7 is a circuit diagram of an LED driving circuit in accordance with a third preferred embodiment of the present invention.

FIG. 7 is a circuit diagram of an LED driving circuit in accordance with a third embodiment of the present invention. The LED driving circuit includes a feedback control circuit 400 and a converting circuit 410, and is utilized for driving an LED module 420. The feedback control circuit 400 receives a feedback signal Fb4 for feedback control, and generates a control signal Sc4 to control the converting circuit 410. The input of the converting circuit 410 is coupled to an input power source VIN, and the output of the converting circuit 410 is coupled to the LED module 420 for outputting an output voltage VOUT to drive the LED module 420 with a plurality of LED strings connected in parallel. In addition, to make sure an identical steady current flowing through each LED units of the LED module 420, a current balancing unit 430 may be used in the LED driving circuit of the present embodiment. The current balancing unit 430 has a plurality of current balancing ends D1~Dn. Each of the current balancing ends D1~Dn is coupled to the corresponding LED string in the LED module 420 so as to balance the current of each of the LED strings. The current flowing through the LED strings also generates the feedback signals Fb4 by flowing through a current detecting resistor R4.

The feedback control circuit 400 includes a feedback unit 450 and a pulse width control unit 460. The feedback unit 450 includes an amplifying unit 452, a compensation unit 454, and a dimming adjusting unit 470. The dimming adjusting unit 470 includes a selection unit 472 and a level difference generating unit 480. In the present embodiment, the level difference generating unit 480 includes a delay unit 482, a trigger unit 484, and a SR flip-flop 486. The trigger unit 484 is a rising edge-triggered one-shot circuit, which receives a dimming signal DIM, and outputs the high level signal to the set input S of the SR flip-flop 486 right after the dimming signal DIM is changed from the second state to the first state. The delay unit 482 receives the dimming signal DIM, and waits for a predetermined delay time after receiving the dimming signal DIM, and then outputs a control signal to the reset input R of the SR flip-flop 486 to reset the SR flip-flop 486. The SR flip-flop 486 outputs a selection signal Sel4 to the selection unit 472 from the output Q. When the selection signal Sel4 is at the low level, a first level signal COMP5 is selected for generating a dimming adjusting signal Vr4; and when the selection signal Sel4 is at the high level, a second level signal COMP6, which has a level higher than that of the first level signal COMP5, is selected for generating a dimming adjusting signal Vr4.

In contrast with the driving circuit of FIG. 6, the amplifying unit 452 in accordance with the present embodiment has a non-inverting input for receiving the dimming adjusting signal Vr4 and the inverting input for receiving the feedback signal Fb4, so as to generate an error signal. In addition, the driving circuit of the present embodiment has a compensation unit 454, which includes a capacitor and a resistor. The relationship between the voltage gain and frequency of the compensation unit 454 may be adjusted for the application circuits, so as to improve transient response of the feedback control circuit 400.

The pulse width control unit 460 includes a pulse width modulation unit 462, a dimming control unit 466, and a driving unit 464, and controls the duty cycle of the control signal Sc4 according to the pulse width control signal Vea4. The pulse width modulation unit 462 may be a comparator, which has a non-inverting input for receiving the pulse width control signal Vea4 and an inverting input for receiving a ramp signal, so as to generate and output a pulse width modulation signal S4 to the driving unit 464. The dimming control unit 466 generates a pulse dimming control signal P4 according to the dimming signal DIM. The operation of the dimming control unit 466 is substantially identical to the dimming control unit 266 of FIG. 3, and thus is not described herein again. The driving unit 464 receives the pulse width modulation signal S4 and the dimming control signal P4. When the dimming signal DIM is in the first state, the driving unit 464 generates the control signal Sc4 according to the pulse width modulation signal S4; and when the dimming signal DIM is in the second state, the driving unit 464 generates the control signal Sc4 according to the dimming control signal P4. It is noted that, within a period right after the dimming single DIM is changed from the second state to the first state, the output signal of the dimming adjusting unit 470 is changed from the first level signal COMP5 to the second level signal COMP6, which shows an increase with a predetermined level. The comparator 452 adjusts the level of the pulse width control signal Vea4 according to the output signal of the selection unit 472 received at the non-inverting input, so as to increase the duty cycle of the control signal Sc4 rapidly to quickly increase the inductor current IL to reduce the amount and the time of level reduction of the output voltage VOUT. Thus, the problem of imprecise dimming control for the LED module 420 right after the dimming signal DIM is changed from the second state to the first state can be improved.

Figure 8:
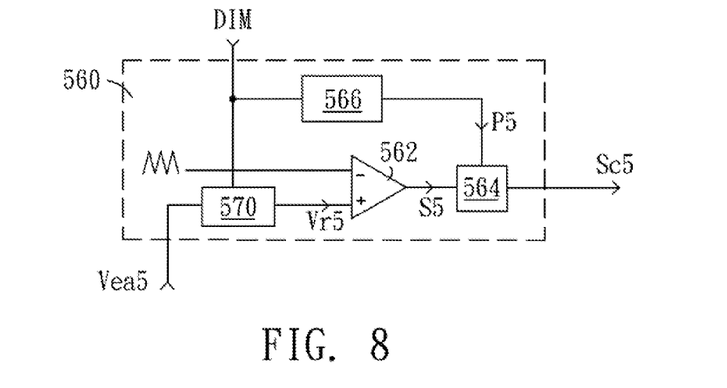
FIG. 8 is a circuit diagram of an LED driving circuit in accordance with a fourth preferred embodiment of the present invention.

FIG. 8 is a circuit diagram of a pulse width control unit in accordance with a fourth preferred embodiment of the present invention. The pulse width control unit 560 includes a pulse width modulation unit 562, a driving unit 564, and a dimming control unit 566. With respect to the pulse width control unit 260 in FIG. 3, the dimming control unit 560 may include a dimming adjusting unit 570 for adjusting the duty cycle of a control signal Sc5. As shown in FIG. 8, the dimming adjusting unit 570 receives the pulse width control signal Vea5 and the dimming signal DIM, and adjusts a level of the pulse width control signal Vea5 according to the dimming signal DIM so as to generate a dimming adjusting signal Vr5. In the present embodiment, the dimming signal DIM is changed between a first state and a second state. The dimming adjusting signal Vr5 outputted to the pulse width modulation unit 562 is raised by a predetermined level within a period right after the dimming signal DIM is changed from the second state to the first state. In contrast, the dimming adjusting unit 570 directly outputs the pulse width control signal Vea5 as the dimming adjusting signal Vr5 without any modification in the other conditions, such as in the time period with respect to the continuation of the first state or in the time period with respect to the continuation of the second state. The pulse width modulation unit 562 has an inverting input for receiving a ramp signal and a non-inverting input for receiving the dimming adjusting signal Vr5, so as to generate and output a pulse width modulation signal S5 to the driving unit 564. The dimming control unit 566 generates a pulse dimming control signal P5 according to the dimming signal DIM. The operation of the dimming control unit 566 is substantially identical to the dimming control unit 266 of FIG. 3 and thus is not described herein again. The driving unit 564 receives both the pulse width modulation signal S5 and the dimming control signal P5. When the dimming signal DIM is in the first state, the driving unit 564 generates the control signal Sc5 according to the pulse width modulation signal S5. When the dimming signal DIM is in the second state, the driving unit 564 generates the control signal according to the dimming control signal P5. It is noted that, within a predetermined period right after the dimming signal DIM is changed from the second state to the first state, the pulse width of the pulse width modulation signal S5 is increased by a predetermined width, such that the duty cycle of the control signal Sc5 is increased by a predetermined value to enhance the output power of the converting circuit rapidly. Thus, the problem of imprecise dimming control for the LED module right after the dimming signal DIM is changed from the second state to the first state can be improved.

Figure 9:
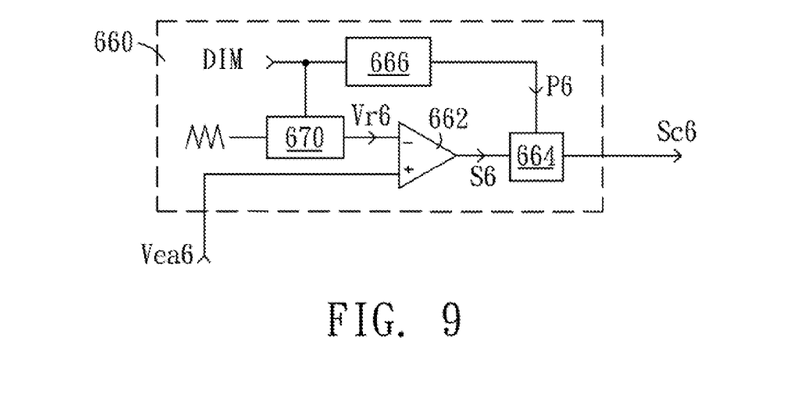
FIG. 9 is a circuit diagram of a pulse width control unit in an LED driving circuit in accordance with a fifth preferred embodiment of the present invention.

FIG. 9 is a circuit diagram of a pulse width control unit in accordance with a fifth embodiment of the present invention.

Figure 10:
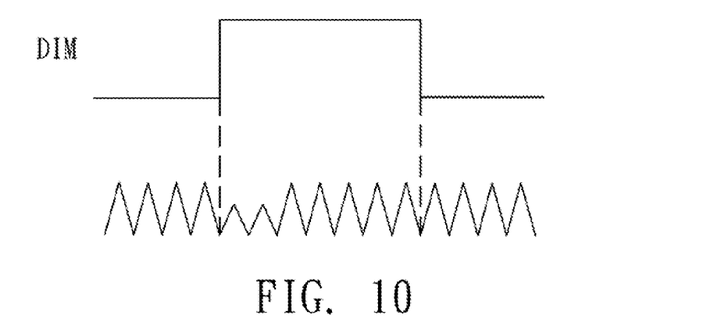
FIG. 10 is a diagram of waveforms showing the signals related to dimming control of the pulse width control unit in FIG. 9 operated by using a ramp wave.

The pulse width control unit 660 includes a pulse width modulation unit 662, a driving unit 664, and a dimming control unit 666. In contrast with the pulse width control unit 260 of FIG. 3, the pulse width control unit 660 may include a dimming adjusting unit 670 for adjusting the duty cycle of a control signal Sc6. The dimming adjusting unit 670 receives a ramp signal, and generates a dimming adjusting signal Vr6 according to the timing of the dimming signal DIM, and the dimming signal DIM is changed between a first state and a second state. Also referring to FIG. 10, the dimming adjusting unit 670 reduces a peak value of a predetermined number of cycles of the ramp signal within a period right after the dimming signal DIM is changed from the second state to the first state, so as to generate the dimming adjusting signal Vr6 outputted to the pulse width modulation unit 662. That is, the amplitude of the predetermined number of cycles of the ramp signal is reduced. In the other conditions, such as in the period in which the first state continues or in the period in which the second state continues, the dimming adjusting unit 670 merely delivers the ramp signal as the dimming adjusting signal Vr6 to the pulse width modulation unit 662. The pulse width modulation unit 662 has an inverting input for receiving the dimming adjusting signal Vr6 and a non-inverting input for receiving a pulse width control signal Vea6, and outputs a pulse width modulation signal S6 to the driving unit 664. The dimming control unit 666 generates a pulse dimming control signal P6 according to the dimming signal DIM. The operation of the dimming control unit 666 is substantially identical to the dimming control unit 266 of FIG. 3 and thus is not described herein again. The driving unit 664 receives both the pulse width modulation signal S6 and the dimming control signal P6. When the dimming signal DIM is in the first state, the driving unit 664 generates the control signal Sc6 according to the pulse width modulation signal S6; and when the dimming signal DIM is in the second state, the driving unit 664 generates the control signal Sc6 according to the dimming control signal P6. The pulse width of the pulse width modulation signal S6 is increased by a predetermined width to increase the duty cycle of the control signal Sc6 by a predetermined value, so as to enhance the output power of the converting circuit within a period right after the dimming signal DIM is changed from the second state to the first state. Thus, the problem of imprecise dimming control for the LED module right after the dimming signal DIM is changed from the second state to the first state can be improved.

Figure 11:
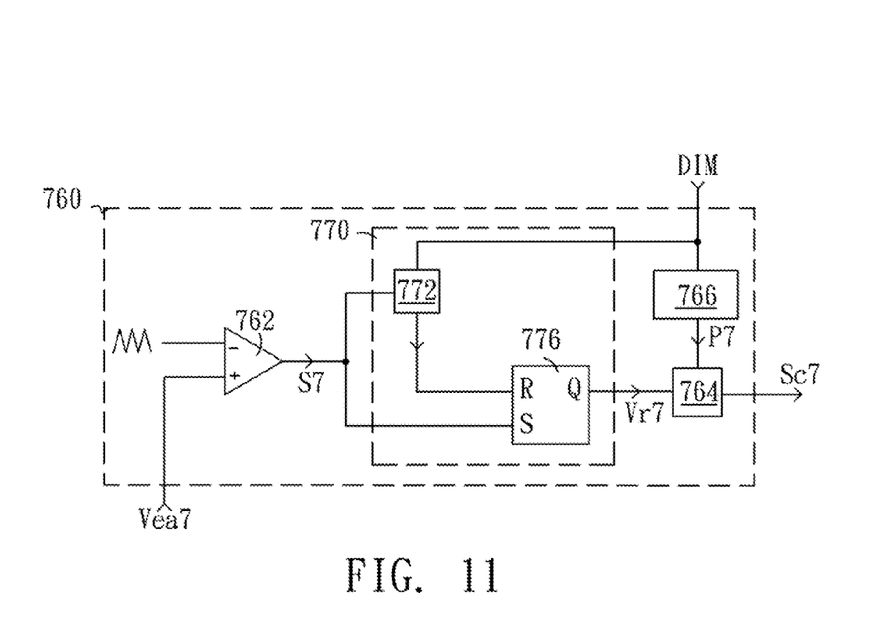
FIG. 11 is a circuit diagram of a pulse width control unit in an LED driving circuit in accordance with a sixth preferred embodiment of the present invention.

FIG. 11 is a circuit diagram of a pulse width control unit in accordance with a sixth embodiment of the present invention. The pulse width control unit 760 includes a pulse width modulation unit 762, a driving unit 764, and a dimming control unit 766. In contrast with the pulse width control unit 260 of FIG. 3, the pulse width control unit 760 may have a dimming adjusting unit 770 for adjusting the duty cycle of a control signal Sc7. The pulse width modulation unit 762 has an inverting input for receiving a ramp signal and a non-inverting input for receiving a pulse width control signal Vea7, and outputs a pulse width modulation signal S7 to the dimming adjusting unit 770. The dimming adjusting unit 770 includes a delayed trigger unit 772 and a SR flip-flop 776. The delayed trigger unit 772 is coupled to the pulse width modulation unit 762. Within a period right after the dimming signal is changed from the second state to the first state, the delayed trigger unit 772 generates a pulse signal to the reset input R of the SR flip-flop 776 in a predetermined time after detecting the falling edge of the pulse width modulation signal S7. Thus, the dimming adjusting signal Vr7 generated by the dimming adjusting unit 770 has a pulse width greater than that of the pulse width modulation signal S7 within a period right after the dimming signal is changed from the second state to the first state. The dimming control unit 766 generates a pulse dimming control signal P7 according to the dimming signal DIM. The operation of the dimming control unit 766 is substantially identical to the dimming control unit 266 in FIG. 3 and thus is not described herein again. The driving unit 764 receives both the dimming adjusting signal Vr7 and the dimming control signal P7. The dimming signal DIM is changed between a first state and a second state. When the dimming signal DIM is in the first state, the driving unit 764 generates the control signal Sc7 according to the dimming adjusting signal Vr7. When the dimming signal DIM is in the second state, the driving unit 764 generates the control signal Sc7 according to the dimming control signal P7. It is noted that, the pulse width of the dimming adjusting signal Vr7 is increased by a predetermined width to increase the duty cycle of the control signal Sc7 by a responded predetermined value, so as to enhance the output power of the converting circuit rapidly to reduce the time and the amount of level reduction of the output voltage. Thus, the problem of imprecise dimming control for the LED module right after the dimming signal DIM is changed from the second state to the first state can be improved.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A feedback control circuit adapted for controlling a converting circuit to convert a power from a power source to drive an LED (Light-Emitting Diode) module, the feedback control circuit comprising:
    a feedback unit for receiving a feedback signal in response to a state of the LED module for generating a pulse width control signal, the feedback unit having a dimming adjusting unit used for generating a dimming adjusting signal according to a time sequence of a dimming signal; and
    a pulse width control unit for generating at least one control signal according to the pulse width control signal for controlling the converting circuit to perform power conversion operation;
    wherein the dimming signal is changed between a first state and a second state, and the pulse width control signal is modulated by the dimming adjusting signal within a period right after the dimming signal is changed from the second state to the first state, so as to increase a duty cycle of the at least one control signal with a predetermined value.

2. The feedback control circuit of claim 1, wherein the period is a predetermined period.

3. The feedback control circuit of claim 1, wherein the duty cycle of the at least one control signal within the period is not smaller than a predetermined duty cycle.

4. The feedback control circuit of claim 1, wherein the period is determined by the feedback unit according to the feedback signal.

5. The feedback control circuit of claim 4, wherein the dimming adjusting unit has a time setting unit for setting the predetermined period.

6. The feedback control circuit of claim 1, wherein the feedback signal is a current feedback signal in response to an LED current of the LED module, or a voltage feedback signal in response to an output voltage applied to the LED module.

7. The feedback control circuit of claim 6, wherein the feedback unit comprises a charging unit, a discharging unit, and a capacitor; the charging unit is coupled the capacitor for charging the capacitor; the discharging unit is coupled to the capacitor for discharging the capacitor; when an output voltage applied to anyone of the LED strings is smaller than a predetermined voltage level, one of the charging unit and the discharging unit is activated; and when the output voltage applied to anyone of the LED strings is higher than the predetermined voltage level, the other one of the charging unit and the discharging unit is activated, and the feedback unit generates the pulse width control signal according to a level of the capacitor.

8. The feedback control circuit of claim 6, wherein the feedback unit further comprises an error amplifier, and the error amplifier has a non-inverting input end for receiving the dimming adjusting signal and an inverting input end for receiving the feedback signal, and an output end of the error amplifier outputs the pulse width control signal.

9. The feedback control circuit of claim 6, wherein the feedback unit further comprises a comparator; the pulse width control unit has a flip-flop; and the comparator receives the dimming signal and the feedback signal, and generates and outputs the pulse width control signal to the flip-flop.

10. The feedback control circuit of claim 7, wherein the dimming adjusting unit is coupled between the charging unit and the capacitor.

11. A feedback control circuit adapted for controlling a converting circuit to convert a power from a power source to drive an LED module, the feedback control circuit comprising:
a feedback unit for receiving a feedback signal in response to a state of the LED module so as to generate a pulse width control signal; and
a pulse width control unit for generating at least one control signal with a duty cycle in response to the pulse width control signal for controlling the converting circuit to perform power conversion operation;
wherein the dimming signal is changed between a first state and a second state, and the pulse width control unit increases the duty cycle of the at least one control signal with a predetermined value within a period right after the dimming signal is changed from the second state to the first state.

12. The feedback control circuit of claim 11, wherein the pulse width control unit has a dimming adjusting unit used for receiving a ramp signal and reducing an amplitude of the ramp signal within the period, and the pulse width control unit decides the duty cycle of the at least one control signal according to the ramp signal and the pulse width control signal.

13. The feedback control circuit of claim 11, wherein the period is decided by the pulse width control unit according to the feedback signal.

14. The feedback control circuit of claim 11, wherein the period is a predetermined period.

15. An LED driving circuit adapted for driving an LED module, the LED driving circuit comprising:
a converting circuit coupled to the LED module for receiving at least one control signal to convert an input voltage into an output voltage to drive the LED module; and
a feedback control circuit for generating the at least one control signal to control the converting circuit to perform power conversion operation according to a feedback signal, wherein the feedback control circuit is operated between a first state and a second state in response to a received dimming signal;
wherein the feedback control circuit modulates a duty cycle of the at least one control signal within a period right after the feedback control circuit is operated from the second state to the first state to, thereby having the duty cycle of the at least one control signal not smaller than a predetermined duty cycle.

16. The LED driving circuit of claim 15, wherein when the converting circuit is operated in the second state, and the feedback control unit generates the at least one control signal with a smallest duty cycle, and the duty cycle of the at least one control signal in response to the second state is smaller than that in response to the first state.

17. The LED driving circuit of claim 15, further comprising:
a voltage detecting circuit coupled to the LED module which has at least one of the LED strings for generating the feedback signal according to a level of the at least one of the LED strings.

* * * * *